R. F. UNDERHILL.
Slotting and Grooving Metal.
No. 17,398.
Patented May 26, 1857.
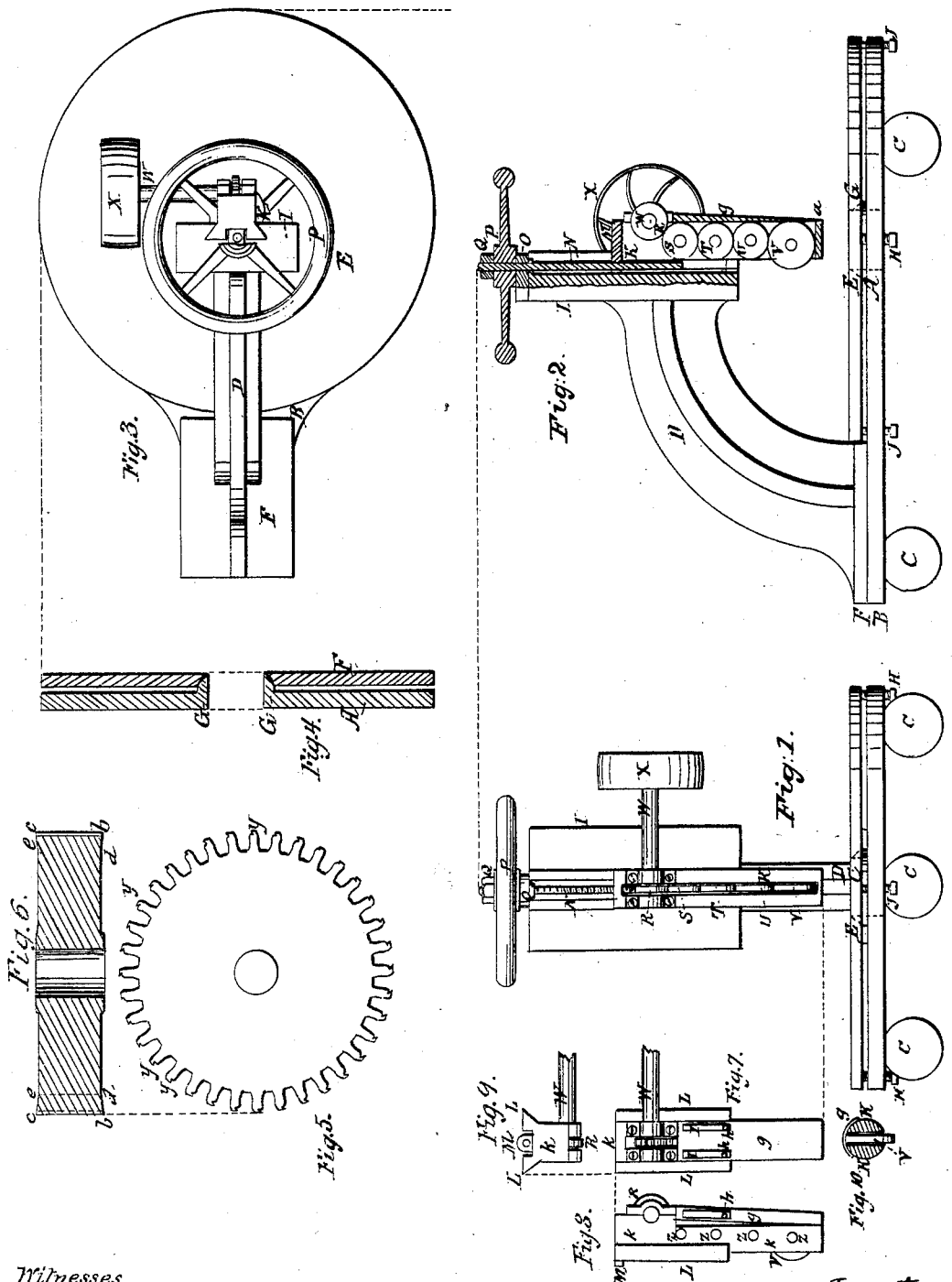

UNITED STATES PATENT OFFICE.

ROBERT F. UNDERHILL, OF INDIANAPOLIS, INDIANA.

MACHINE FOR CUTTING GROOVES AND SLOTS.

Specification of Letters Patent No. 17,398, dated May 26, 1857.

*To all whom it may concern:*

Be it known that I, ROBERT F. UNDERHILL, of the city of Indianapolis, in the county of Marion and State of Indiana, have invented a new and improved machine or apparatus for cutting grooves or slots, technically called "key-seats," in the holes, technically called "eyes," through metal wheels or other articles or for any other purpose to which the same may be applicable; and I do hereby declare that the following is a full and exact description thereof, reference being had to the accompanying drawings, making a part of this specification, and to the letters of reference marked thereon, in which—

Figure 1, is a front view of the machine. Fig. 2, is a side view of the frame work, and a sectional view of the upper head and moving portions. Fig. 3 is a top or "bird's-eye" view of the machine.

A, Figs. 1 and 2, is a circular plate or table, through the center of which is a round aperture, as shown in Fig. 3, and by the dotted lines in Figs. 1 and 2. From one side of the table A a portion B, projects. The said table A is supported on three legs C, C, C, Figs. 1 and 2, or any other convenient number.

E, Figs. 1, 2 and 3, is an adjustable circular plate or table, with a round aperture in its center of the same diameter as the aperture in the center of the lower table A, as shown in Fig. 4, and by the dotted lines in Figs. 1 and 2. The said table E is supported by a cylindrical ring G, which is a part of the lower table A, and rises above its upper surface immediately outside of the circular aperture before mentioned in the center of the table A. The lower surface of the table E, immediately around the aperture in its center is so fitted to the top of the cylindrical ring G, as to form a "ball and socket" joint as clearly shown in Fig. 4 (which is a sectional view of the tables A and E) and by the dotted lines in Figs. 1 and 2.

H, H, and J, J, Figs. 1 and 2, are four set screws which pass through the lower table A near its circumference and at opposite points.

D, Figs. 1, 2, and 3, is a curved "standard," which is firmly secured by its base F to the projecting position B, of the lower table A. To the upper end of the said "standard" D, is secured an upright head I. In the front portion of the head I, is a dovetail, as shown in Fig. 3. The said dovetail extends from the top to the bottom of the head I.

K, Figs. 1, 2 and 3, is a sliding "arbor," which for convenience in its construction can be made in two parts, cut perpendicularly in Fig. 1. Fig. 7 is a front view of the said "arbor" K, with the wedge ($g$) attached. Fig. 8 is a side view, Fig. 9 is a top or "bird's-eye" view, and Fig. 10 is a cross section through the line ($a$) Fig. 2. The upper one half, more or less, of the said "arbor" K, is fitted to the dovetail in the head I, Figs. 3, 7 and 8, and is firmly held to its place laterally by the dovetail, but is free to move up and down in the said dovetail. The lower portion, one half more or less of the "arbor" K is round (as shown in Figs. 1 and 10) and is, say, two inches in diameter, but may be constructed of any other size.

N is a screw, passing through the nut M, which is secured to the "arbor" K at its top. The upper end of the screw N passes through the bearing O, Figs. 1 and 2, which is secured to the top of the head I. Immediately above the bearing O the hand wheel P is secured to the screw N by the nut Q. The "arbor" K has a vertical slot or mortise through it, which extends from near the top to near the bottom of the said "arbor" K as shown in Fig. 1. R, S, T and U, are cog wheels, placed in the said slot or mortise in the "arbor" K, all of which gear into one another. V is a circular cutter, which has cogs upon its circumference, and is also placed in the said slot or mortise in the "arbor" K, near the lower end of the said slot or mortise. The cog wheel U gears into the cogs upon the said cutter V. The cog wheel R, is secured to the shaft W. On the outer end of the said shaft is a pulley or band wheel X. The cog wheel S, T, U, and the cutter V are secured to short shafts which have their bearings in the "arbor" K (the ends of which are shown in Fig. 8 at Z, Z, Z, Z).

The cog wheels which are placed in the slot or mortise before mentioned in that part of the "arbor" K which is round, to wit, the lower one half more or less, must not be any larger in diameter than the said round part of the "arbor." The cog wheels which are placed in the slot or mortise in that part of the "arbor" which is fitted to the dovetail, to wit, the upper one half more or less, may be of any desired size. The cutter V may also be larger in diameter than the said round part of the "arbor" K. The bearings of the said cutter must be removed to one side of the center of the "arbor" K, so that a portion of it (the cutter) will project beyond the periphery of the "arbor" K, and it must project on but the one side as shown in Figs. 2 and 8.

Fig. 5 is a side view of the cutter V on a larger scale. Fig. 6 is a section of the same. The said cutter V is made of cast steel or any other suitable material, and has cogs cut upon its circumference similar to any cog wheel. Small notches are cut into one side of the cogs at their outer ends, the said notches reach entirely across the face or thickness of the wheel. The said notches are so made as to form sharp cutting edges on the outer end of the cogs, as shown at (y) (y) (y) Fig. 5. The outer end of the cogs on the said cutter V are made a little longer than the inner end, that is, the distance from (b) to (c) Fig. 6 is greater than from (d) to (e) as shown. When the cutter V is thus constructed it is "tempered" to a sufficient degree of hardness to cut iron or other metals.

(g) Figs. 7, 8 and 9 is an adjustable wedge secured to the front of the "arbor" K by the screws (h) in the slots (I) in the said wedges. Fig. 2, shows a vertical section of the wedge (g) on the front of the "arbor" K.

Operation: The table E is leveled up by the set screws J, J, so that a line drawn in its upper surface from a point immediately over one of said set screws to a similar point over the other will form right angles with the "arbor" K. The other two set screws H H are drawn away from the said table E, so that the said table may oscillate upon the "ball and socket joint" before mentioned (on the cylindrical ring C) and the set screws J, J. The operator now raises the "arbor" K to the top of the head I (in the dovetail) by the hand wheel P and screw N, and a metal wheel is placed loosely upon the central part of the table E, over the aperture in its center. In order to give a clear idea of the operation I will suppose that the "eye" of the wheel placed upon the table is of the same diameter as the round part of the "arbor" K, and also that the wedge (g) is removed from the "arbor" K as shown in Fig. 1. Motion now being given to the band wheel or pulley X, it is communicated to the cutter V by the shaft W and cog wheel R, S, T, U. The operator now lowers the "arbor" K by the hand wheel P and screw N, before mentioned, toward the table E. The end of the "arbor" K enters the "eye" of the wheel (which is upon the table) and as it entirely fills the said "eye", the projecting portion of the cuter V, as shown in Figs. 2 and 8, comes in contact with the inner periphery of the "eye" of the said wheel, and as the "arbor" K descends, cuts a slot or groove, technically called a "key seat," in the said inner periphery of the "eye" of the said wheel. The aperture in the two tables A and E at their centers is made for the purpose of letting the "arbor" enter it, so that the cutter V may pass entirely through the wheel which is having a "key seat" cut in it. The cutter V being of the same thickness as it is desired to have the key seat made, so soon as it has passed once through the "eye," the "key seat" is completed, thus rendering the operation a very rapid one, and since the table E is so arranged as to oscillate as before described, the "arbor" K in its descent through the "eye" forces the wheel to assume a position at right angles to the "arbor," so that the sides of the "key seat" will be straight through, or in other words, will be parallel with the axis of the said wheel. When the cutter V in its descent reaches the bottom of the wheel on the table the "key seat" is completed, and the operator raises the "arbor" K to the top of the head I and the wheel just cut is removed from the table, leaving the machine in readiness to have the operation repeated.

In the case just described the "key seat" would be of the same depth all the way through, whereas, it should be made wedge shape, that is, a little deeper upon one side of the wheel than the other. To remedy the defect I attach the adjustable wedge (g), before mentioned, to the front of the "arbor" K as seen in Figs. 2, 7 and 8. If a wheel with an "eye" a little larger in diameter than the round part of the "arbor" K be now placed upon the table E as before described and the "arbor" K is lowered as before, as it passes through the "eye" of the wheel, the wedge (g) comes in contact with the inner periphery of the "eye" of the said wheel on the side opposite the projecting portion of the cutter V, and forces the wheel toward the said cutter, causing a "key seat" to be made which is deeper at the lower side of the wheel than at the top, in the same ratio that the wedge (g) is thicker at the top than the bottom. When the cutter V has reached the lower side of the wheel, the "arbor" K is withdrawn as before.

The wedge (g) can be moved down upon the "arbor" a distance equal to the length of the slots, I, I, in the said wedge; this is done in order to make the "arbor" fill larger "eyes" than those described. In this way "key seats" may be cut in wheels which have "eyes" that vary nearly an inch in diameter. But if the "eye" of the wheel is considerably larger than the "arbor" K, the said wheel must be secured to the table E by screw bolts or otherwise, in such a position that when the "arbor" K is lowered the cutter V will come in contact with the inner periphery of the eye of the said wheel. Previously, however, to lowering the "arbor" K, the table E must be inclined by the set screws J, J; and the set screws H H must be made to touch the said table E and hold it in such a position that a line drawn in its upper surface from a point immediately over one of said set screws, H, H, to a similar point over the other, will form right angles with the "arbor" K. The said "arbor" K now being lowered, the cutter V (being still in motion) makes a "key seat" of any desired inclination or wedge shape.

The wedge (g) before mentioned can be replaced with one much larger, if so desired, for more readily adapting the machine to the different sized "eyes" in which it is necessary to cut "key seats."

Having now described my invention in detail, and fully explained the manner of its operation, I proceed to state what I claim as my invention. I do not claim the tables A or E. Neither do I claim the set screws H, H, J, J, nor the cylindrical ring C, nor the "ball and socket" joint on the top of the said cylindrical ring. Neither do I claim the curved "standard" D, nor the head I. Neither do I claim the screw N, nor the hand wheel P, taken separately. Neither do I claim as new the using of revolving circular cutters, for such have long been used. But

I do claim, and desire to secure by Letters Patent of the United States—

1. Forming cutting edges on the outer ends of the cogs of cogged wheels, substantially as described for the purpose set forth.

2. The combination of the cutter V, as constructed, the cogged wheels R, S, T, U, the shaft W, and the slotted "arbor" K, with the adjustable wedge (g), and table E, or any equivalent device, arranged substantially as described for the purpose set forth.

ROBERT F. UNDERHILL.

Witnesses:
ROBT. R. UNDERHILL,
THOS. W. WRIGHT.